No. 790,505. PATENTED MAY 23, 1905.
C. J. KOENIG.
GLASS BLOWING MACHINE.
APPLICATION FILED NOV. 27, 1903.

4 SHEETS—SHEET 2.

ATTEST.
Carl F. Yeakel
C. M. Schoen

INVENTOR.
Christian Julius Koenig

No. 790,505. PATENTED MAY 23, 1905.
C. J. KOENIG.
GLASS BLOWING MACHINE.
APPLICATION FILED NOV. 27, 1903.
4 SHEETS—SHEET 3.
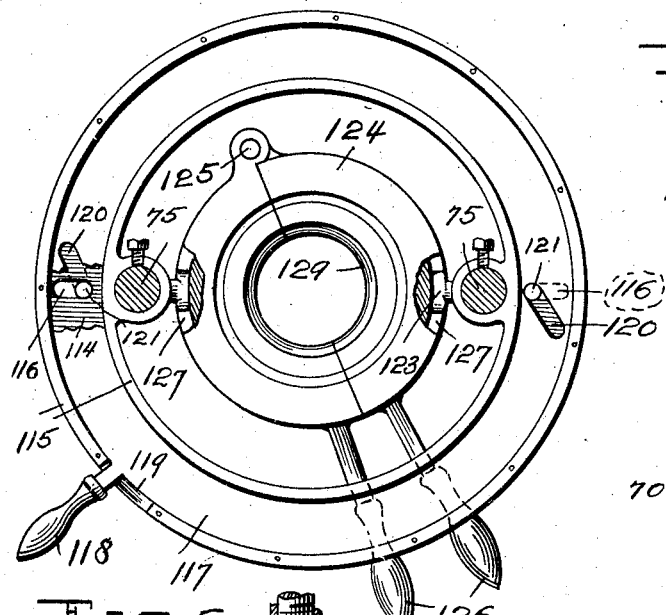
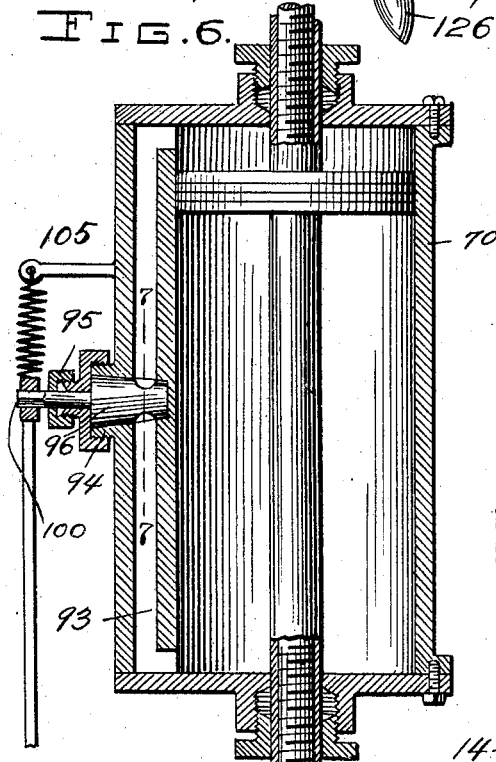
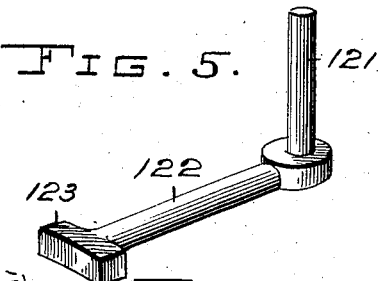
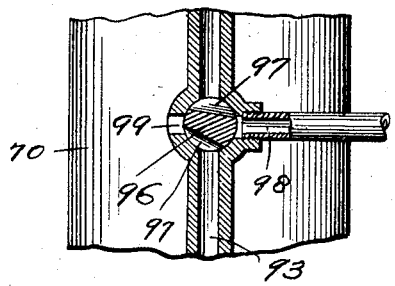
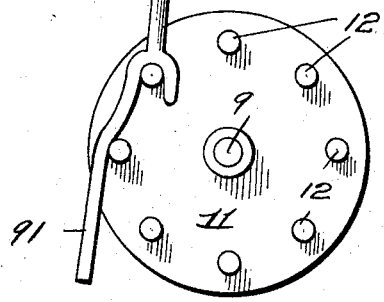
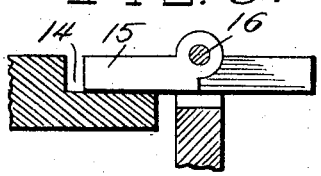
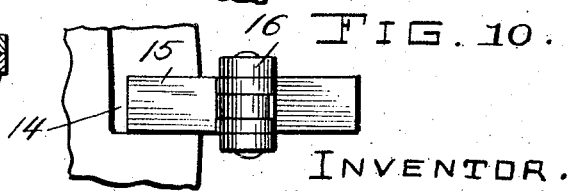
ATTEST.
Carl G. Yeakel
C. H. Schoen
INVENTOR.
Christian Julius Koenig

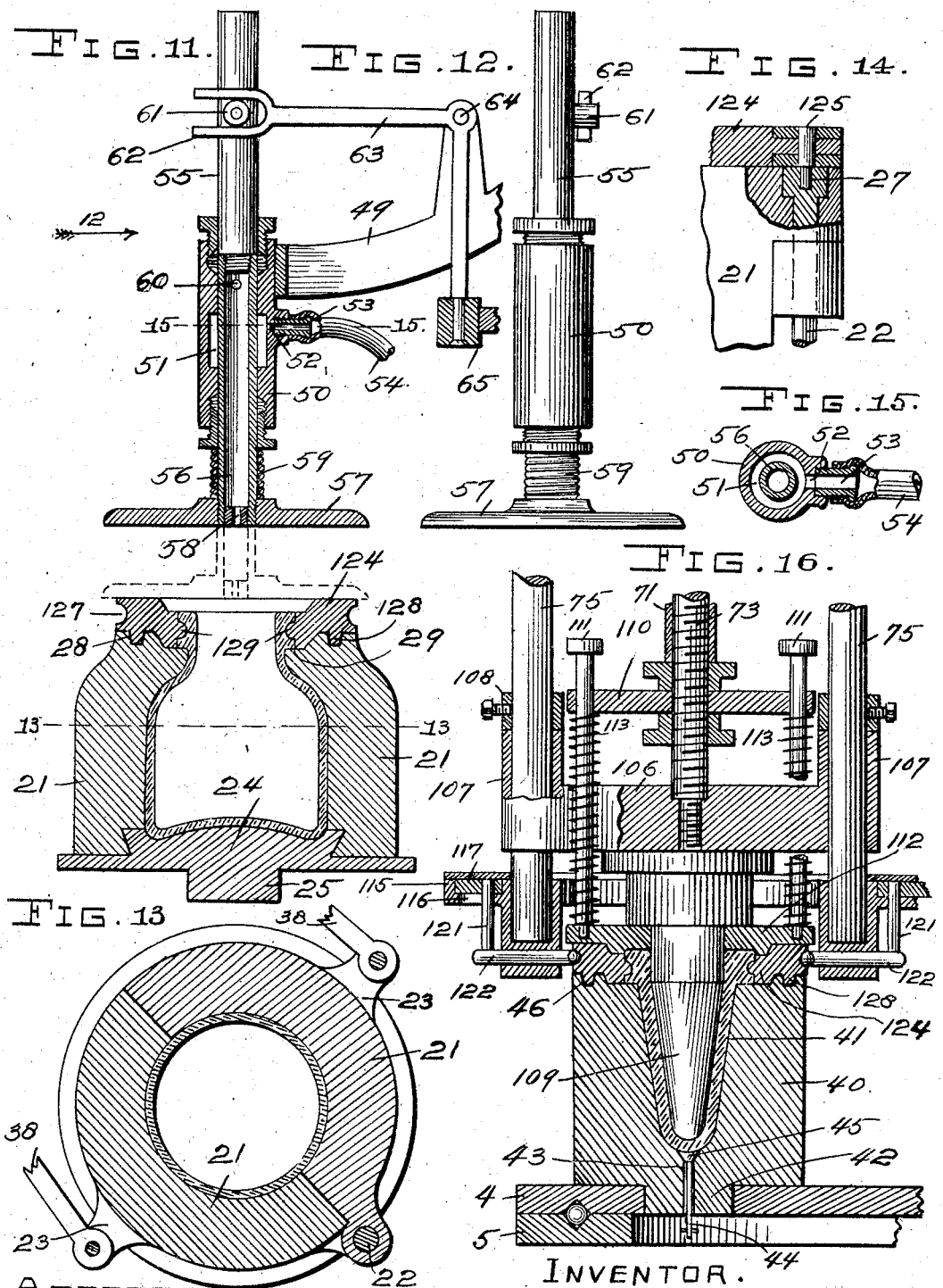

No. 790,505.

Patented May 23, 1905.

UNITED STATES PATENT OFFICE.

CHRISTIAN JULIUS KOENIG, OF ALTON, ILLINOIS.

GLASS-BLOWING MACHINE.

SPECIFICATION forming part of Letters Patent No. 790,505, dated May 23, 1905.

Application filed November 27, 1903. Serial No. 182,756.

*To all whom it may concern:*

Be it known that I, CHRISTIAN JULIUS KOENIG, a citizen of the United States, residing at Alton, county of Madison, State of Illinois, have invented certain new and useful Improvements in Glass-Blowing Machines, of which the following is a full, clear, and exact description, reference being had to the accompanying drawings.

My invention relates to a machine which will automatically perform all the operations required for blowing glass jars, bottles, and the like.

The object of my invention is to produce a simple inexpensive machine that when in operation requires but very little attention and which will operate very rapidly in order to increase the output of the machine.

To the above purposes my invention consists in certain new and novel features of construction and arrangement of parts that will hereinafter be more fully described, pointed out in the claims, and illustrated in the accompanying drawings, in which—

Figure 1:
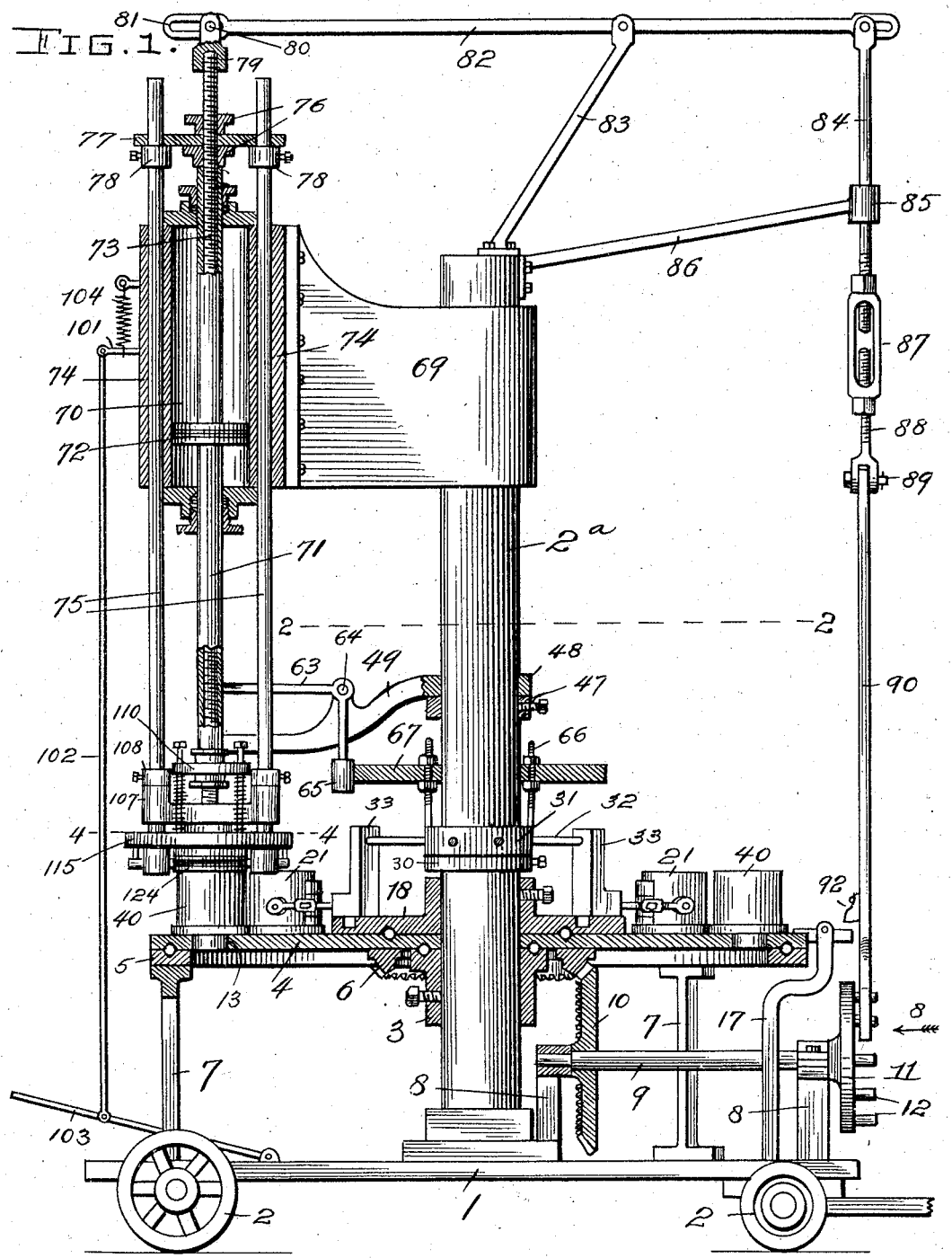
Figure 2:
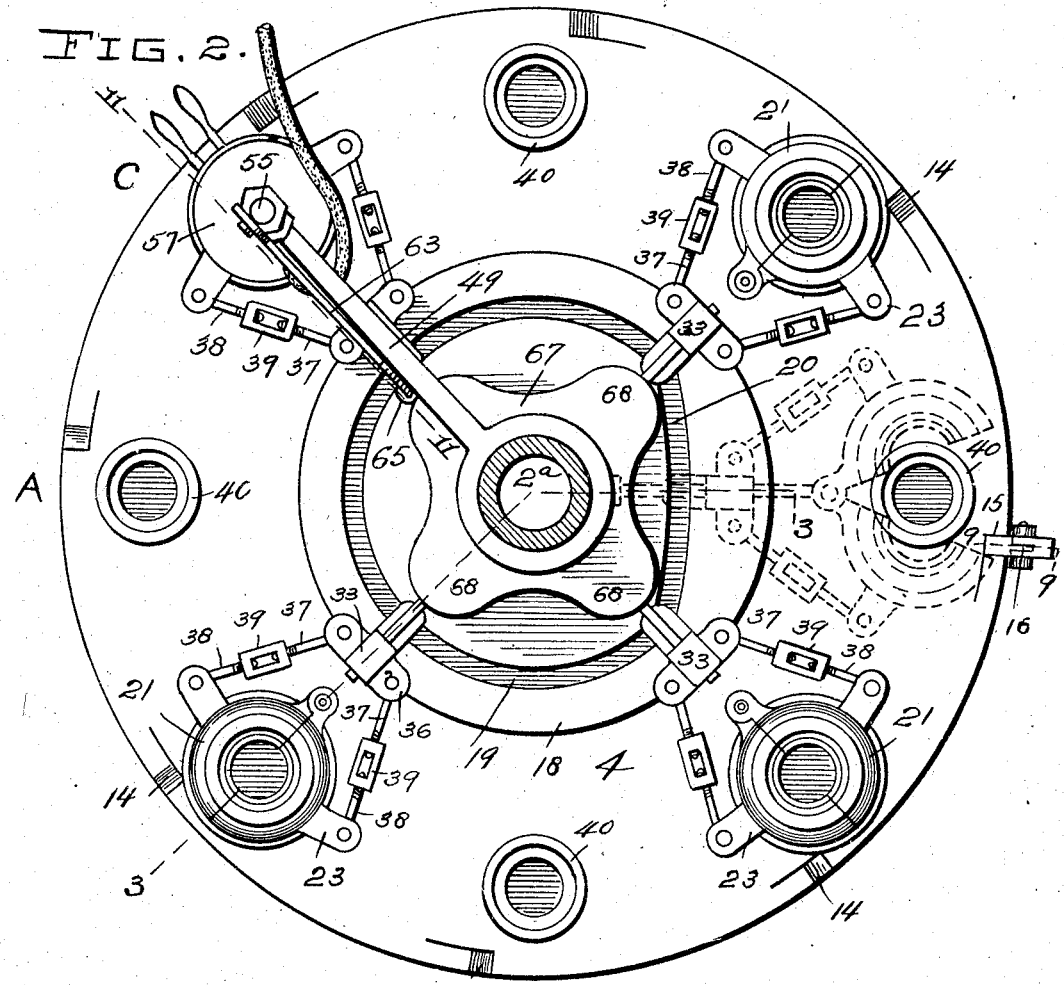
Figure 3:
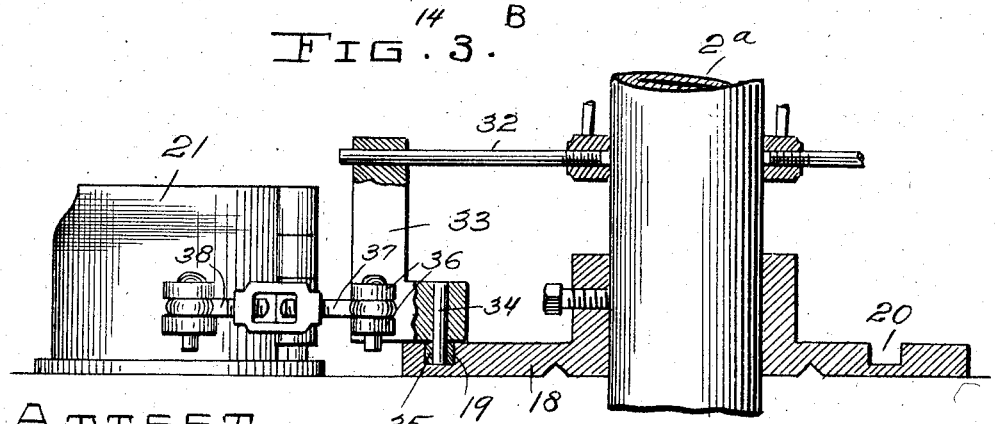

Figure 1 is a vertical section taken through the center of my improved machine. Fig. 2 is a horizontal section taken approximately on line 2 2 of Fig. 1. Fig. 3 is a detail sectional view taken approximately on line 3 3 of Fig. 2. Fig. 4 is an enlarged horizontal section taken approximately on the line 4 4 of Fig. 1 and showing the neck-ring and the parts for engaging the same. Fig. 5 is a perspective view of one of the neck-ring-engaging fingers. Fig. 6 is a vertical sectional view through the center of the cylinder made use of for operating the various parts of my machine. Fig. 7 is a vertical sectional view taken approximately on line 7 7 of Fig. 6. Fig. 8 is a detail elevation looking in the direction indicated by the arrow 8, Fig. 1. Fig. 9 is an enlarged sectional view taken approximately on line 9 9 of Fig. 2. Fig. 10 is a plan view of the parts seen in Fig. 9. Fig. 11 is an enlarged vertical section taken approximately on the line 11 11 of Fig. 2. Fig. 12 is an elevation looking in the direction indicated by the arrow 12 in Fig. 11. Fig. 13 is a horizontal section taken approximately on line 13 13 of Fig. 11. Fig. 14 is a detail sectional view showing the manner in which the neck-ring is removably positioned upon the blow-mold. Fig. 15 is a horizontal section taken approximately on line 15 15 of Fig. 11. Fig. 16 is a vertical sectional view taken through one of the blank-molds and showing the plunger in position upon said mold and a glass-blank formed in said mold.

Referring by characters to the accompanying drawings, 1 indicates a suitable bed-plate or base that supports all of the mechanism of the machine and which is mounted upon traction-wheels 2 in order that the machine may be readily moved from one place to another. Rigidly fixed to the center of the base 1 and projecting upwardly therefrom is a post $2^a$.

3 indicates a sleeve that is rigidly positioned on the post $2^a$ a short distance above the base 1, said sleeve supporting a rotating table 4. The outer edge of this table 4 bears upon a ring 5, that is supported by standards 7. Rigidly secured to the under side of the table 4 is a circular rack 6, the teeth of which are beveled.

Rotatably arranged in suitable bearings 8 immediately to the rear of the post $2^a$ is a horizontal shaft 9, carrying a beveled gear-wheel 10, that meshes with the teeth of the circular rack 6. On the outer end of the shaft 9 is a disk 11, provided in its outer face with a series of outwardly-projecting pins 12, there being the same number of these pins as there are blow and blank molds carried by the table 4, as hereinafter described.

Formed in the outer portion of the table 4 is a series of circular apertures 13 equidistant apart and adapted to receive the bases of the blow and blank molds of the press. These blow and blank molds are arranged alternately. Formed in the top surface of the table 4 immediately adjacent these openings 13 are notches 14. Adapted to engage in these notches are the inner portions of a locking-finger 15, which is divided at its center by a knife-blade hinge 16, and being pivotally arranged in the upper end of a standard 17 that extends upwardly from the base 1. (See Figs. 9 and 10.) Arranged immediately above the table 4 and rigidly secured to the post 2ᵃ is a disk 18, in the top of which is formed a cam-groove 19, a portion 20 of which extends closer to the center of the disk than the remainder of said groove.

The blow-molds, which will now be described, comprise mating portions 21, hinged together by pins 22 and each half provided with a pair of outwardly-projecting ears 23. The mating parts 21 of each mold are normally positioned on a base-plate 24, which base-plate is provided with a depending portion 25, that passes through its corresponding opening 13 in the table 4. The pins 22, that hinge the mating parts of the mold together, have their lower ends seated in the table 4, and in their upper ends are formed pin-holes 27. The top surface of each blow-mold when together is provided with an annular groove 28, and the opening into said mold at the upper end is slightly depressed, as indicated by 29. (See Fig. 11.)

Rigidly secured to the post 2ᵃ above the disk 18 is a collar 30, on which is rotatably arranged a ring 31, from which projects outwardly a series of rods 32, there being the same number of these rods as there are blow-molds, and the outer ends of said rods slide through suitably-formed apertures in the upper ends of blocks 33, that are arranged to travel on the outer edge of the disk 18. Each block 33 is provided with a downwardly-projecting pin 34, that enters the cam-groove 19 in the disk 18, and each pin is provided with an antifriction-roller 35, that rides in said groove. (See Fig. 3.) Each block 33 is provided on its sides with laterally-projecting ears 36, and pivotally secured between each pair of said ears are the ends of rods 37. Pivotally secured between each pair of ears 23 on the sections of the blow-mold are the ends of rods 38, and each corresponding pair of rods 37 and 38 is joined by turnbuckles 39. (See Figs. 2 and 3.)

The blank-molds made use of in my improved machine comprise cylindrical blocks 40, each provided with a centrally-arranged tapering chamber 41, said blank-molds being arranged alternately between the blow-molds and provided on their under sides with circular projections 42, that are seated in the corresponding apertures 13 in the table 4. Extending from the chamber 41 in each blank-mold, through the bottom thereof, is an aperture 43, in which is loosely arranged a pin 44, having its upper end formed into a taper valve 45, that seats in the lower end of the chamber 41. In the top of each blank-mold is formed an annular groove 46, corresponding in size to the annular groove 28 in the top of the blow-mold. Rigidly fixed upon the post 2ᵃ a distance above the collar 30 is a collar 47, on which is seated a ring 48, provided with an outwardly-projecting arm 49, which carries the blowing-valve now to be described. This valve comprises a vertically-arranged cylindrical casing 50, that occupies a position immediately over the path of travel of the molds carried by the table 4. The cylindrical casing 50 is provided with an annular chamber 51, into which leads an aperture 52, and said aperture communicating with a hollow stem 53, that is seated in the wall of the casing 50. To this stem 53 is fixed the pipe 54, that conveys the compressed air or other blowing medium from its source of supply. Arranged to slide vertically through the casing 50 is a rod 55, the lower portion 56 of which is hollow, and rigidly secured to the lower end of said hollow portion is a plate 57, there being an apertured plug 58 seated in the lower end of said hollow portion 56. An expansive coil-spring 59 is located upon the portion 56 of the rod 55 and interposed between the lower end of the casing 50 and the plate 57. Formed through the wall of the upper part of the hollow portion 56 of the rod 55 is an aperture 60, which when the rod 55 is in its lowermost position establishes communication between the annular chamber 51 and the interior of the hollow part 56 of the rod 55. Located upon the upper portion of the rod 55 is a roller 61, which is engaged by the bifurcated end 62 of the horizontal arm of a bell-crank 63, that is pivoted at 64 to a portion of the arm 49. The lower end of the vertical arm of this bell-crank 63 is provided with an antifriction-roller 65.

Extending upwardly from the ring 31 is a series of rods 66, upon which is mounted a disk 67, provided with four outwardly-projecting lugs or cams 68, the same being arranged at equal distances apart. The outer edges of these cams or lugs and disks 67 ride directly against the antifriction-roller 65. (See Figs. 1 and 11.)

Rigidly secured to the upper end of the post 2ᵃ and projecting laterally therefrom is a bracket 69, to the outer end of which is rigidly secured a cylinder 70. Arranged to slide vertically through this cylinder 70 is a tubular piston-rod 71, on which is mounted a piston 72 within the cylinder 70, and through which tubular piston-rod passes a screw-threaded rod 73. Arranged to slide through vertical bearings 74 on opposite sides of the cylinder 70 is a pair of rods 75. Adjustably positioned on the upper portion of the screw-threaded rod 73 and held in position by means of nuts 76 is a plate 77, the ends of which receive the upper ends of the rods 75, there being collars 78 located upon said rods 75 immediately beneath the ends of said plate 77.

To the upper end of the rod 73 is secured a socket 79, which carries a horizontally-arranged pin 80, that projects through a slot 81, formed in the end of a lever 82, which is fulcrumed to the upper end of a bracket 83, that extends upwardly from the top of the post 2ᵃ. The outer end of this lever 82 terminates at a point immediately over the disk 11, and loosely connected to the outer end of said lever is the upper end of a rod 84, that passes through a vertical guide 85 on the end of a bracket 86, secured to the upper end of the post 2ᵃ, and to the lower end of said rod 84 is secured one end of a turnbuckle 87. Into the lower end of said turnbuckle is secured the upper end of a rod 88, the lower end of which is linked at 89 to a rod 90, that extends downwardly to a point immediately in front of the disk 11. (See Figs. 1 and 8.) The lower end of this rod 90 is bifurcated and adapted to engage over the pins 12, carried by the disk 11, one arm 91 of said bifurcated end being much longer than the opposite arm. This rod 90 carries an adjustable block 92, that is adapted to engage against the outer end of the locking-finger 15 when said rod 90 moves downwardly.

Formed in the wall of the cylinder 70 is a vertically-extending port or passage 93, the ends of which terminate at the upper and lower ends of the chamber within the cylinder 70. At the center of this port or passageway is formed a valve-casing 94, which is provided with an ordinary stuffing-box 95 and in which is rotatably arranged a tapered valve 96, in the opposite sides of which are formed grooves 97. Leading into the valve-chamber 94 at right angles to the port or passage-way 93 is the inlet-port 98, and formed in the valve-casing 94 directly opposite this inlet-port is the exhaust-port 99. The grooves 97 are so arranged that when steam or compressed air is allowed to enter the cylinder above the piston the steam or compressed air that is below the piston will exhaust out through the lower portion of the port or passage-way 93 and the exhaust-port 99, or vice versa.

The valve 96 is provided with a valve-stem 100, to the outer end of which is secured a lever 101, and to the outer end of said lever is pivotally secured the upper end of a rod 102, that extends downwardly to the base 1 and is there pivotally secured to a foot-lever 103. A retractile coil-spring 104 is secured to the lever 101 and to a pin 105, projecting outwardly from the cylinder 70. This spring normally holds the valve 96 so that the pressure medium is beneath the piston 72 and holds the same in the upper end of the cylinder 70, as seen in Fig. 6. The lower end of the rod 73 is screw-seated in a plate 106, which is provided on its ends with sleeves 107, through which the lower ends of the rods 75 pass, there being set-collars 108 arranged on said rods 75 above the sleeves 107. Rigidly secured to the under side of the plate 106 is a plunger 109, which is adapted to enter the blank-mold and form the glass-blank therein. Upon the lower portion of the rods 73 above the plate 106 is adjustably seated a plate 110, through the outer portions of which pass rods 111, the lower ends of which carry a ring 112, through which the plunger 109 passes, and expansive coil-springs 113 are arranged upon these rods 111 and interposed between the plates 110 and 112. Rigidly secured to the lower ends of the rods 75 below the plate 106 is a ring 114, provided on its edges with the upwardly-projecting flanges 115. Formed through this ring 114, on opposite sides thereof, are the short horizontal slots 116. Arranged for slight rotary movement upon the ring 114 between the flanges 115 is a ring 117, the same being provided with an operating-handle 118, that projects through an opening 119, formed in the outer one of the flanges 115. Formed in the opposite sides of this ring 117 and immediately over the slots 116 are the diagonally-arranged slots 120. The upper ends of pins 121 pass through the corresponding slots 116 and 120, the lower ends of said pins being rigidly secured to horizontally-arranged fingers 122, that pass through depending portions of the ring 117 beneath the rods 75, and the inner ends of said fingers 122 are provided with the horizontally-arranged lugs 123. The lip-ring, which comprises a pair of semicircular mating sections 124, hinged together by a pin 125, is provided with operating-handles 126, and said lip-ring is provided in its outer face with an annular groove 127, in which is adapted to engage the lugs 123. The under side of said lip-ring is provided with an annular flange 128 and is so formed as to fit snugly upon the top surface of either the blank-mold or blow-mold, and the inner face of said lip-ring is provided with an inwardly-projecting flange 129.

The operator stands immediately in front of the machine or immediately adjacent the blank-mold (indicated by A, Fig. 2) and operates the foot-lever 103, which controls the valve 96, that allows the pressure medium to pass alternately above and below the piston 72 in the cylinder 70. The table 4 rotates intermittently, as will be hereinafter described, and a proper quantity of molten glass is deposited in each blank-mold as it comes around to the point marked B, Fig. 2. After two more intermittent movements of the table this particular blank-mold containing the proper quantity of glass is brought to the position A and immediately beneath the plunger 109. The operator now manipulates the foot-lever 103 so as to turn the valve 96 and allows the pressure medium to pass into the upper end of the cylinder 70, thus forcing the piston 72, piston-rod 71, and rod 73, and various parts carried thereby downwardly. Previous to this downward movement of the plunger and various parts carried by the piston and piston-rod the operator places a lip-ring 124 upon the top of the blank-mold, said lip-ring being closed and with its depending flange 128 occupying the annular groove 46 in the top of the blank-mold. The operating-handle 118 had previously been moved so as to shift the ring 117, containing the slots 120, into such a position as that the pins 121 were caused to move outwardly and to correspondingly draw the rods 122 and lugs 123 outwardly, this action being brought about by the angularity of the slots 120 relative the short slots 116. As the various parts descend the plate 112 first engages on top of the lip-ring 124 with a yielding pressure, and the plunger 109 as it moves downwardly to its limit of movement forms the molten glass in the blank-mold 40 and forces a portion thereof upwardly around the inner edge of the lip-ring 124 and around the flange 129 thereof. The operator now by means of the handle 118 shifts the ring 117 so as to bring the pins 121 to the inner ends of the slots 116, and this movement causes the lugs 123 to engage in the annular groove 127 in the outer edge of the lip-ring. The operator now removes his foot from the foot-lever, and the retractile coil-spring 104 draws the lever 101, rod 102, and lever 103 upwardly, thus shifting the valve 96 into a position whereby the pressure medium is transferred from the chamber above the piston 72 to the chamber beneath, and correspondingly the piston, piston-rod 71, rods 75, and parts carried thereby will be elevated, and in so doing the lugs 123, engaging the lip-ring 124, will carry said lip-ring upwardly, which lip-ring now carries the molten-glass blank. As the various parts move upwardly the forward end of the lever 82 will be elevated and the rear end thereof depressed, and as the rods 84, 88, and 90 move downwardly the bifurcated lower end of the rod 90 will engage one of the pins 12 of the disk 11 and partially rotate said disk, and as a result the shaft 9 and beveled gear-wheel 10 will be likewise partially rotated. As said rod 90 moves downwardly the block 92 will engage the outer end of the locking-finger 15 and raise the inner end thereof out of the notch 14, in which it was seated, thus allowing the table 4 to be partially rotated as the partial rotary motion of the beveled gear-wheel 10 is imparted to the circular rack 6. This partial rotation of the table brings one of the molds to the point A directly in front of the operator, and he again operates the foot-lever 103, so as to shift the valve 96 and allow the pressure medium to pass into the cylinder above the piston and force the parts downwardly, as hereinbefore described. This movement locates the glass blank in the blow-mold, and after it has been accomplished the operator's foot is removed from the treadle and the reverse movement again takes place, as hereinbefore described, and the table is shifted its proper distance, so as to bring the blow-mold containing the glass blank into the position C, Fig. 2, or immediately beneath the blow-valve, and when so positioned a blank-mold filled with molten glass is at the point A immediately beneath the plunger. As the table 4 rotates and the molds move around therewith the blocks 33 move around on the disk 18, and the ring 31 is likewise moved. The plate 67, carrying the lugs 68, being connected with said ring 31, moves therewith, and the lugs are intermittently and successively brought around into engagement with the roller 65, and as a result thereof the bell-crank 63 is operated and the rod 55 and plate 57 are elevated, as seen in Fig. 11. The tendency of the coil-spring 59 is to force the plate 58 downwardly, as shown by dotted lines in Fig. 11, and consequently the roller 65 is always in engagement with the edges of the lugs 68. The disk 67, carrying these lugs, is so arranged that the roller 65 is at a point between two of the lugs 68, and when in this position the rod 55 and plate 57 are at their lowermost limit of movement, said plate 57 resting directly upon the lip-ring 124. This action brings the port 60 into communication with the annular space 51 in the valve-cylinder 50, and the compressed air used for blowing is now free to pass from the tube 54 downwardly through the hollow portion 56 of the rod 55 and into the glass blank within the blow-mold, and said glass blank is blown into proper shape. The next intermittent movement of the table 4 brings one of the lugs against the roller 65, and the various parts just mentioned are elevated, and the blowing-air to the blow-mold is cut off. The table 4 is intermittently moved in the manner hereinbefore described until the blow-mold containing the bottle or jar properly blown reaches the rear side of the machine or at a point directly opposite the operator, and when in this position the antifriction-roller 35 travels into the portion 20 of the groove 19, thus drawing the block 33 inwardly toward the post 2ª and opening the mold, as shown by dotted lines in Fig. 2. The blown bottle or jar and the lip-ring, which latter opened with the blow-mold, are now removed, and the operation is complete.

A glass-blowing machine of my improved construction is comparatively simple, is practically automatic, therefore requiring very little attention, and a large number of uniformly-blown jars or bottles can be turned out in a comparatively short space of time.

I claim—

1. In a glass-blowing machine, a post, a table arranged for rotation upon said post, blank-molds and blow-molds arranged alternately upon said table, a cylinder arranged above the table, a piston within said cylinder, a piston-rod operated through both ends of said cylinder, a plunger carried by the lower end of the piston-rod for entering the blank-molds, means connected to and operated from the upper end of the piston-rod for intermittently rotating the table, a blow-valve positioned over the path of travel of the molds, and means whereby said blow-valve is opened whenever a blow-mold is in position beneath said valve, substantially as specified.

2. In a glass-blowing machine, a post, a table arranged for rotation thereon, a series of blank and blow molds, arranged alternately at equal distances apart upon said table, a cylinder arranged above the table, a piston operating therein, a piston-rod for said piston, the ends of which piston-rod operate through the ends of the cylinder, means connected to and operated from the upper end of the piston-rod for intermittently rotating the table, a plunger at the lower end of the piston-rod, and means detachably secured to the lower end of the piston-rod for transferring a glass blank from the blank-mold to the blow-mold, substantially as specified.

3. In a glass-blowing machine, a post, a table arranged for rotation thereon, a series of blank and blow molds arranged alternately upon said table, a cylinder arranged above the table, a piston within said cylinder, a piston-rod operated through both ends of said cylinder, a plunger carried by the lower end of the piston-rod for entering the blank-molds to form a glass blank, means carried by the lower end of the piston-rod for engaging the glass blank and transferring it to the adjacent blow-mold, means connected to the upper end of the piston-rod for intermittently rotating the table, a blow-valve arranged above the table in the path of travel of the molds, and means whereby said blow-valve is automatically operated whenever a blow-mold is in position beneath said blow-valve, substantially as specified.

4. In a glass-blowing machine, a post, a table rotated thereon, a series of blank-molds arranged at equal distances apart upon said table, a series of separable blow-molds arranged between the blank-molds, means whereby a glass blank is formed successively in the blank-molds, means whereby the glass blank is transferred to the adjacent blow-mold, a blow-valve arranged above the path of travel of the molds, means whereby the blow-valve is operated whenever a blow-mold is in position beneath said blow-valve, a plate fixed to the post above the rotating table, and having a cam-groove therein, blocks arranged to slide upon said plate, pins carrying rollers projecting from said blocks into a cam-groove, and connections from said blocks to the parts of the separable blow-molds, substantially as specified.

5. In a glass-blowing machine, a post, a table arranged for rotation thereon, a series of blank and blow molds arranged alternately upon the table, a cylinder arranged above the table over the path of travel of the molds, a piston-rod operating through said cylinder, a piston within said cylinder upon the piston-rod, means connected to the upper end of the piston-rod for intermittently rotating the table with the upstroke of the piston, a plunger carried by the lower end of the piston-rod for entering the blank-molds, means carried by the lower end of the piston-rod for engaging the glass blank after it has been formed in the blank-mold and transferring it to the next adjacent mold, a blow-valve arranged above the table over the path of travel of the molds, means whereby said blow-valve is automatically operated whenever a blow-mold is in position beneath said blow-valve, and means whereby the blow-molds are automatically opened to allow the removal of the work, substantially as specified.

6. In a glass-blowing machine, a rotating table, blow-molds carried thereby, a blowing-valve arranged above the path of travel of said molds, a bell-crank arranged to actuate the blowing-valve, and a cam rotating with the table, and which bears against the free end of the bell-crank, substantially as specified.

7. In a glass-blowing machine, a post, a table rotating thereon, blank and blow molds arranged upon said table, a piston-rod arranged above the path of travel of the blank-molds, a plunger carried by the piston-rod and adapted to enter the blank-molds, a blowing-valve supported by the post over the path of travel of the blowing-valves, a bell-crank for actuating the blowing-valve, and a rotating cam engaging against the free end of the bell-crank, substantially as specified.

8. In a glass-blowing machine, a rotating table, a series of blow-molds carried by said table, which blow-molds are made in mating sections and hinged together, hinge-pins for said blow-molds, having recesses in their upper ends, a hinged lip-ring adapted to seat on said blow-molds, and a hinge-pin for said lip-ring, which pin is adapted to seat in the recesses of the blow-mold hinge-pins, substantially as specified.

9. In a glass-blowing machine, the combination with blank and blow molds having continuous grooves formed in their top surfaces, of a hinged lip-ring having a bead on its under side adapted to enter the grooves of the blank and blow molds, and having a continuous bead formed on the inner face of the lip-ring, and a hinge-pin for said lip-ring that is adapted to enter a suitably-formed recess in the blow-mold, substantially as specified.

10. In a glass-blowing machine of the class described, a blowing-valve comprising a fixed cylindrical casing provided with an annular air-chamber, into which air is admitted, a tubular shaft sliding through said casing, means whereby said tubular shaft is held elevated, said shaft being provided with an air-inlet port that is normally positioned above the annular air-chamber, a plate carried by the lower end of the tubular shaft, and an expansive coil-spring interposed between the plate and the lower end of the casing, substantially as specified.

11. In a glass-blowing machine, the combination with the blow and blank molds having continuous grooves in their tops, of a hinged lip-ring provided with a continuous bead on its under side, a continuous bead on its inner face, and having a continuous groove formed in its outer face, substantially as specified.

CHRISTIAN JULIUS KOENIG.

Attest:
  CARL F. YEAKEL,
  E. M. SCHOEN.